(12) United States Patent
Monpeurt et al.

(10) Patent No.: US 11,974,064 B2
(45) Date of Patent: Apr. 30, 2024

(54) LIGHT DISTRIBUTION DEVICE BASED ON A PLANAR WAVEGUIDE

(71) Applicant: COMMISSARIAT A L'ENERGIE ATOMIQUE ET AUX ENERGIES ALTERNATIVES, Paris (FR)

(72) Inventors: Cyrielle Monpeurt, Grenoble (FR); Gabriel Jobert, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 238 days.

(21) Appl. No.: 17/329,503

(22) Filed: May 25, 2021

(65) Prior Publication Data

US 2021/0377464 A1 Dec. 2, 2021

(30) Foreign Application Priority Data

May 28, 2020 (FR) ..................... 20 05622

(51) Int. Cl.
*F21V 8/00* (2006.01)
*G01J 3/10* (2006.01)
*H04N 5/33* (2023.01)

(52) U.S. Cl.
CPC .............. *H04N 5/33* (2013.01); *G01J 3/10* (2013.01); *G02B 6/002* (2013.01); *G02B 6/0045* (2013.01)

(58) Field of Classification Search
CPC ...... G02B 6/0021; G02B 6/0011–0095; F21V 2200/20
See application file for complete search history.

(56) References Cited

U.S. PATENT DOCUMENTS

| | | | |
|---|---|---|---|
| 6,139,163 A | 10/2000 | Satoh et al. | |
| 2002/0093809 A1* | 7/2002 | Yoneda | G01N 21/8806 362/800 |
| 2008/0084709 A1 | 4/2008 | Li et al. | |

FOREIGN PATENT DOCUMENTS

| | | | |
|---|---|---|---|
| EP | 3 488 221 A1 | 5/2019 | |
| WO | WO 2018/015517 A1 | 1/2018 | |

OTHER PUBLICATIONS

French Preliminary Search Report dated Jan. 25, 2021 in French Application 20 05622 filed on May 28, 2020, 2 pages (with English Translation of Categories of Cited Documents).

* cited by examiner

*Primary Examiner* — Sean P Gramling
(74) *Attorney, Agent, or Firm* — Oblon, McClelland, Maier & Neustadt, L.L.P.

(57) ABSTRACT

A light distribution device, for distributing light rays from an ancillary light source onto a scene to be lighted. The device includes a planar waveguide, a recess in the planar waveguide for injecting light rays into the planar waveguide, and a through opening in the planar waveguide for extracting light rays from the planar waveguide. In this way, light can be distributed over a large area, homogeneously and with a thin, easily manufactured device.

14 Claims, 5 Drawing Sheets

LIGHT DISTRIBUTION DEVICE BASED ON A PLANAR WAVEGUIDE

TECHNICAL FIELD

The invention is concerned with a light distribution device adapted, in use, to receive light rays from a light source and distribute these rays over a scene to be lighted.

STATE OF PRIOR ART

Lensless optical imaging systems are known from prior art, in which a detector module acquires a wide field image of a sample. The sample and detector module are placed in close proximity to each other, with no imaging optics between them. A light source provides light for lighting the sample. A light distribution device may be arranged at the output of the light source, to collect light from a narrow light beam emitted by the light source, and distribute this light over an extended area belonging to the sample. The light distribution device has advantageously a reduced thickness, enabling it to be housed in a space with a thickness less than or equal to the distance separating, in use, the sample from the detection module.

Patent application FR1914926 describes an example of such an optical system for implementing an infrared spectrometric analysis on a sample. In this example, the light distribution device consists of a series of passive extraction structures, each coupled to a respective secondary waveguide, and integrated with the secondary waveguides onto a same substrate. The secondary waveguides are themselves coupled to a main waveguide by evanescent coupling. The passive extraction structures are each formed by a reflective surface, located at the output of the corresponding secondary waveguide and obliquely tilted to the plane of the substrate. Each reflective surface is formed by a reflective coating deposited on an etched interface of the substrate.

Such a light distribution device has several drawbacks, especially a complex manufacturing method requiring the creation of a multitude of secondary waveguides and facets obliquely in the substrate, and an inhomogeneous light distribution on the surface to be lighted of the sample.

It is a purpose of the present invention to provide a light distribution device suitable for integration into a lensless imaging optical system to, in use, distribute light rays from an ancillary light source onto a scene to be lighted, and which does not have the above-mentioned drawbacks of prior art.

DISCLOSURE OF THE INVENTION

This purpose is achieved with a light distribution device configured to, in use, distribute light rays from an ancillary light source onto a scene to be lighted, and which includes:
- a planar waveguide, of which two faces of greater extent are parallel to each other and each form a respective main face of the planar waveguide;
- a recess, which extends into the planar waveguide from one of the main faces, and which forms an injection zone configured to perform injection of light rays into the planar waveguide; and
- a through opening, which extends into the planar waveguide from one to the other of its main faces, and which forms an extraction zone configured to perform extraction, out of the planar waveguide, of light rays injected into the injection zone and having travelled in the planar waveguide.

The thickness of the light distribution device corresponds to the thickness of the planar waveguide. The light distribution device may therefore have a reduced thickness, especially compatible with its integration into a lensless imaging optical system such as that described in the introduction. In particular, the light distribution device according to the invention can easily have a thickness less than or equal to the distance that separates, in use, the sample and detection module in the lensless imaging optical system described in the introduction. This thickness is advantageously less than or equal to 1.5 mm.

The manufacture of a light distribution device according to the invention requires making two structures, only within a single planar waveguide. The light distribution device according to the invention can therefore be manufactured in a simple, fast and inexpensive way.

In operation, light is injected into the light distribution device at the recess forming an injection zone. It enters the planar waveguide by being refracted. It then travels through the planar waveguide, from the injection zone to the extraction zone, by successive reflections from the main faces of the planar waveguide and preferably with at least one reflection from a side face of the planar waveguide. During its propagation in the planar waveguide, light is confined only along the thickness axis of the planar waveguide. In the other two dimensions of space, propagation in the planar waveguide can thus result in a spatial spread of the light, even greater than the spatial spread that would be obtained in free space (by virtue of propagation by successive reflections and not in a straight line). At the extraction zone, the light that has travelled through the planar waveguide is extracted therefrom towards the scene to be lighted. Light emerges from the planar waveguide by being refracted, at the side edges of the through opening.

In use, the light distribution device according to the invention thus achieves recovery of the light from a narrow light beam, and distribution of this light in a homogeneous manner, on a large surface area located outside the planar waveguide. Said large surface area preferably belongs to a sample to be analysed. It preferably has a width greater than or equal to 1 mm (the width being the greatest distance between two points on the surface in question, for example a diameter or a major axis of an ellipse).

The invention thus makes it possible to distribute the light over a large area, in a homogeneous manner, and using a thin device that is easy to manufacture.

According to a first advantageous embodiment:
- the planar waveguide has its two main faces each in square shape and has a rectangular parallelepiped shape, and
- in a projection of the light distribution device in the plane of one of the main faces of the planar waveguide, the recess and the through opening are each centred on a line separating said main face into two rectangles with the same dimensions, with the respective centres of the recess and the through opening each being situated at the same distance from the centre of said main face.

Advantageously, the recess has a shape of a first pyramid, wherein said first pyramid is a right pyramid with a square base.

The through opening may have a shape of a second, truncated-square pyramid, wherein said second pyramid is a right pyramid with a square base. The first pyramid and the second pyramid may have their respective bases parallel to the main faces of the planar waveguide, and be oriented in two opposite directions.

Alternatively, the through opening may have the shape of a volume of revolution, invariant about an axis orthogonal to the main faces of the planar waveguide, and the intersection between the planar waveguide and a generatrix of said volume of revolution may comprise a curved segment.

According to a second advantageous embodiment:
the planar waveguide has its two main faces each in the shape of an ellipse and has a shape of a right cylinder with an elliptical base,
each elliptical-shaped main face is provided with two foci, and
in a projection of the light distribution device in the plane of one of the main faces of the planar waveguide, the recess and the through opening are each centred on a respective one of said foci.

Advantageously, the recess is shaped like a whole or truncated-square cone of revolution. The through opening may have a shape of a volume of revolution, invariant about an axis orthogonal to the main faces of the planar waveguide, and the intersection between the planar waveguide and a generatrix of said volume of revolution can comprise a curved segment.

Preferably, the planar waveguide is infrared transparent.

Advantageously:
the recess is configured to perform injection, into the planar waveguide, of light rays from an upper half-space; and
the through opening is configured to perform extraction of light rays, from the planar waveguide, and towards a lower half-space;
wherein the lower and upper half-spaces together form a three-dimensional space, and each extend to a respective side of a plane parallel to the main faces of the planar waveguide and passing halfway up through the planar waveguide.

The invention also covers an infrared imaging system which includes:
a light distribution device according to the invention, configured to, in use, distribute light rays from an ancillary light source onto a scene to be lighted; and
a detection module, including an array infrared detector configured to receive light rays reflected by the scene to be lighted;
with the infrared detector array facing the through opening of the light distribution device.

The system can further include an infrared light source forming the ancillary light source, and the light distribution device is configured to, in use, receive as input light rays from said infrared light source and distribute these rays over the scene to be lighted, with the input to the light distribution device formed by the recess of the light distribution device.

The system may further include a spacing element, integrally mounted with the detector module, and having a support surface and a through opening, with the support surface located on a side of the spacing element opposite to the detector module, and with the through opening facing the array infrared detector, and wherein the light distribution device forms all or part of the spacing element.

BRIEF DESCRIPTION OF THE FIGURES

The present invention will be better understood upon reading the description of exemplary embodiments given by way of illustration only and in no way limiting, with reference to the appended drawings in which.

DESCRIPTION OF THE EMBODIMENTS

For ease of reading, the axes of an orthonormal reference frame (Oxyz) have been represented in the figures.

Throughout the text, the term "infrared" is concerned with part of the light spectrum belonging to a spectral band ranging from 0.78 µm to 50 µm, more preferentially from 2 µm to 12 µm.

Throughout the text, a planar waveguide refers to an optical guide element, capable of guiding the propagation of light by successive reflections on planar faces parallel to each other (here it is more particularly, a refractive guide). In a planar waveguide, light is confined along one axis in three-dimensional space, and free to propagate along the other two axes in three-dimensional space. Formally, a waveguide consists of a core, in which the light travels, and a sheath, which provides a desired optical index difference between the core and a medium surrounding the core. Through misuse of language, the core can be equated with a waveguide. Here, a planar waveguide therefore refers to the core of a planar waveguide. In practice, the planar waveguide consists of an optical part with a small dimension along one of the axes in three-dimensional space (here the axis (Oz) with a thickness), and large dimensions along each of the other two axes in three-dimensional space (here the length, respectively width axes (Ox) and (Oy)). The ratio of the thickness to the length, respectively of the thickness to the width, is preferably greater than or equal to 5, or even greater than or equal to 10. The optical part consists of a material which is optically transparent to the wavelengths to be propagated, for example with a transmission rate greater than or equal to −3 dB/cm at said wavelengths. This optical part is preferably monolithic, formed in one piece. It advantageously has a homogeneous optical index throughout its volume, with an identical chemical composition throughout its volume.

Figure 1A:
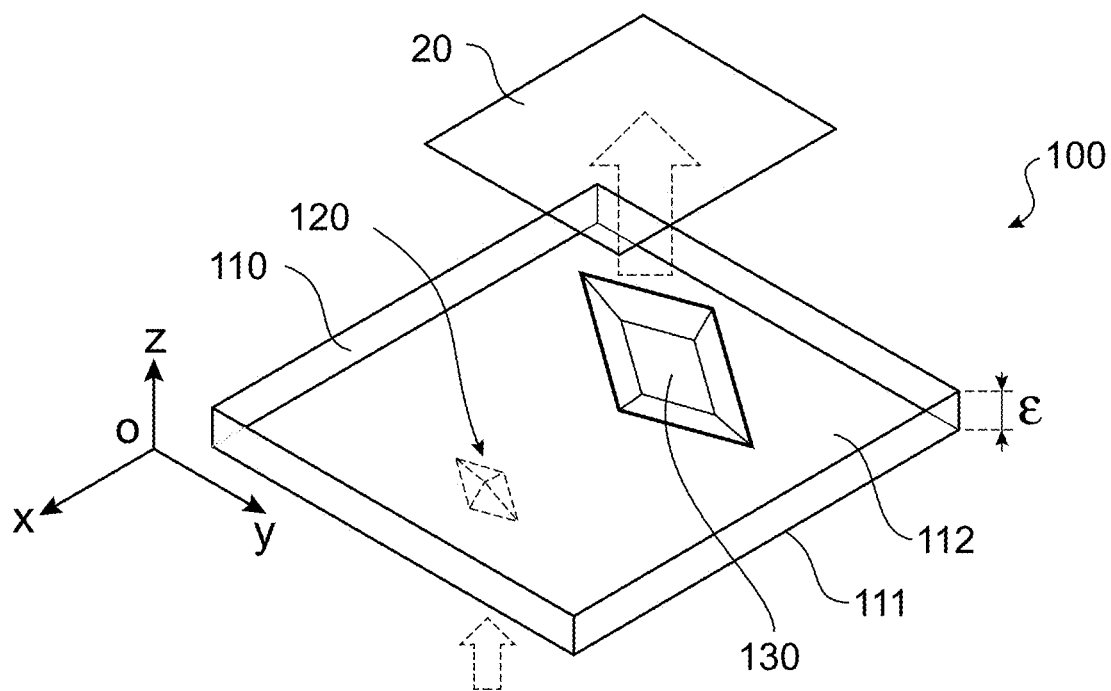
FIG. 1A schematically illustrates, and in a perspective view, a first embodiment of a light distribution device according to the invention.

A first embodiment of a light distribution device 100 according to the invention is described first. This device 100 is illustrated in FIG. 1A, in a perspective view. It includes a planar waveguide 110, here in the form of a rectangular parallelepiped with a square base. The thickness ε of the planar waveguide is preferably between 100 μm and 1.5 mm, preferably between 100 μm and 1.0 mm, for example equal to 725 μm. The length and width of the planar waveguide 110 are each between 5 mm and 20 mm, for example each substantially equal to 10 mm. The planar waveguide is delimited, along the axis (Oz), by two faces 111, 112 parallel to the plane (xOy), and named first and second main face respectively. The first and second main faces 111, 112 are the faces of the planar waveguide with the largest surface area, here of square shape.

The planar waveguide 110 is provided with a recess 120 and a through opening 130.

The recess 120 refers to a recessed zone, which extends into the interior of the planar waveguide 110 from one of the main faces, here the first main face 111. The height h of the recess 120 is measured along the same axis (Oz) as the thickness E of the planar waveguide (see FIG. 1D). The height h of the recess 120 is strictly lower than the thickness ε of the planar waveguide, for example at least twice lower. For example, there is a recess with a depth of 0.3 mm in a planar waveguide with a thickness of 725 μm. The dimensions of the recess along the axes (Ox) and (Oy) are decreasing away from the first main face 111. The recess 120 here has a first pyramid shape, where the first pyramid is a right pyramid with a square base with its base, parallel to the plane (xOy) of the main face 111. The recess 120 thus defines four tilted facets in the planar waveguide, which are the triangular faces of the first pyramid.

The through opening 130 refers to a hole that runs through the planar waveguide 110 from one of the main faces 111 and 112 to the other. The dimensions of the through opening 130 along the axes (Ox) and (Oy) are increasing away from the first main face 111 and closer to the opposite to main face 112. The through opening 130 here has the shape of a second truncated pyramid, where the second pyramid is a right pyramid with a square base whose base is parallel to the plane (xOy) of the main faces 111 and 112. The through opening 130 thus defines four tilted facets in the planar waveguide, which are the trapezoidal faces of the truncated pyramid. The largest diameter of the through opening is preferably greater than or equal to 1 mm, for example 1.36 mm.

The first and second pyramids, which define the shape of the recess 120 and the shape of the through opening 130 respectively, have their respective bases parallel to each other, and opposite orientations. In other words, respective vectors connecting the base to the apex, for each of these two pyramids, are oriented in two opposite directions. In FIG. 1G, the device 100 has been represented in a cross-section view in a plane (xOz) passing through the recess 120 and through the through opening 130, and showing in dotted lines the first pyramid P1 and the second pyramid P2. In each pyramid P1 or P2 respectively, the vector V1 or V2 respectively, parallel to (Oz) and connecting the base to the apex, is represented.

The first and second pyramids have distinct values of the angle at the base, where the angle at the base is the angle formed between the base of the pyramid and each triangular face of the pyramid. The angle at the base takes for example a value $\alpha 1 = 54.74°$ for the first pyramid P1 defining the shape of the recess 120, and a value $\alpha 2 = 45°$ for the second pyramid P2 defining the shape of the through opening 130.

Further, the first and second pyramids each have their square bases rotated by 45°, in a plane (xOy), relative to the square shapes of the main faces 111, 112 of the planar waveguide.

Figure 1B:
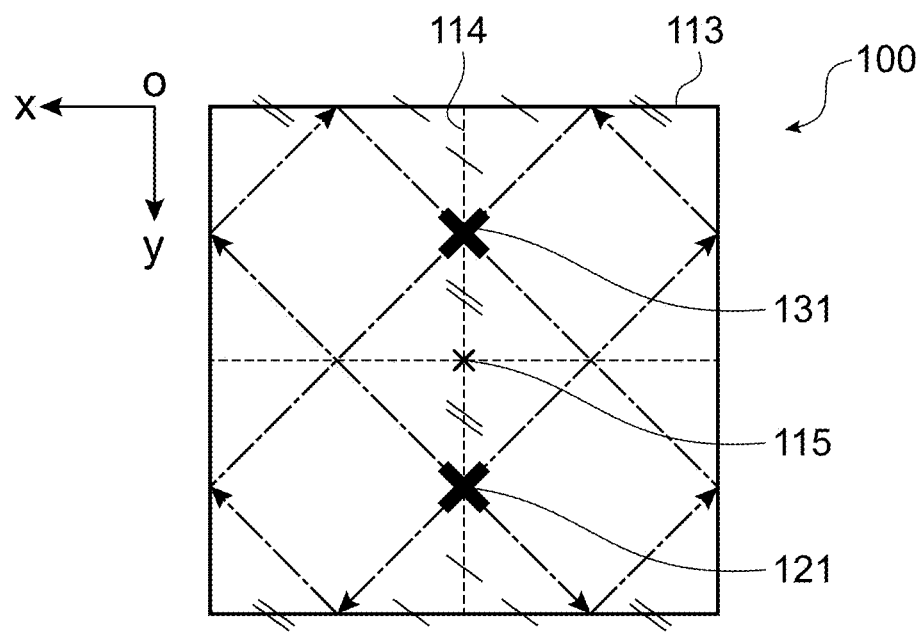
FIG. 1B schematically illustrates the respective positions of the recess and through opening in a device similar to that of FIG. 1A.

FIG. 1B schematically illustrates the positioning of the recess and through opening in the planar waveguide. In FIG. 1B, the device 100 has been represented in a projection in the plane of one of the main faces 111, 112 of the planar waveguide. The projection of the planar waveguide, in this plane, is a square 113. A first cross 121 symbolises the projection, in this plane, of the geometric centre of the recess. A second cross 131 symbolises the projection, in this plane, of the geometric centre of the through opening. The two crosses 121, 131 are both located along a line 114 (dotted line) separating the square 113 into two rectangles with the same dimensions. Further, the two crosses 121, 131 are each located at the same distance from the centre 115 of the square 113. In FIG. 1B, the equal distances are symbolised with one tilted dash for a first series of line segments of equal length, and two tilted dashes for a second set of line segments of equal length. This positioning of the recess and through opening in the planar waveguide ensures the same cumulative optical path length for all light rays travelling in the planar waveguide between the recess and the through opening. The optical paths followed by each of these rays have been schematically represented in dash and dot line. There are thus a multitude of possible pairs of positions of the recess and the through opening on the planar waveguide 110. FIGS. 1A and 1C to 1G more particularly illustrate the case where the respective centres of the recess 120 and the through opening 130 are both located at the same distance from the centre 115 of the planar waveguide 110, according to a projection in the plane of the main face 111, respectively 112.

Figure 1C:
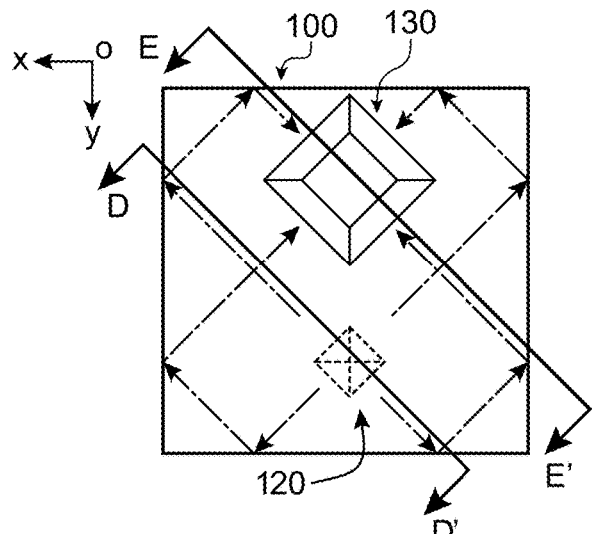
FIG. 1C, FIG. 1D, FIG. 1E, FIG. 1G illustrate different cross-section views of the device of FIG. 1A.

FIG. 1C illustrates the device 100 of FIG. 1A, in a top view. FIG. 1C shows the pyramidal recess 120 and the truncated-square pyramid-shaped through opening 130.

Figure 1D:
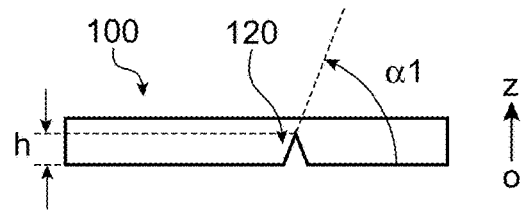

FIG. 1D illustrates the device 100 of FIG. 1A, in a cross-section view in a plane (DD') as indicated in FIG. 1C, passing through the recess 120 and aligned with a direction of light propagation in the planar waveguide (plane parallel to (Oz) and tilted by 45° relative to (Ox) and (Oy)).

Figure 1E:
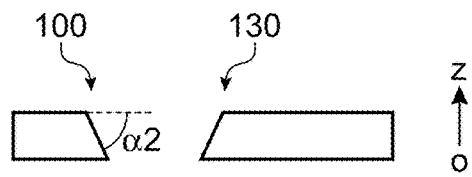

FIG. 1E illustrates the device 100 of FIG. 1A, in a cross-section view in a plane (EE') as indicated in FIG. 1C, passing through the through opening 130 and aligned with a direction of light propagation in the planar waveguide (plane parallel to (Oz) and tilted by 45° relative to (Ox) and (Oy)).

In operation, the device 100 is immersed in a gaseous or liquid surrounding medium, preferably air. An injection light beam arrives at the device 100, preferably oriented along an axis normal to the plane (xOy) of the planar waveguide 110. Preferably, an intersection between the injection light beam and the device 100 covers the entire recess 120, here each of the tilted facets of the recess 120. Furthermore, a central axis of the injection light beam is preferably aligned with a central axis of the recess 120, here an axis connecting the apex and the centre of the base of the first pyramid P1. Light from the injection light beam enters the interior of the planar waveguide 110 at the recess 120, by being refracted at each of the tilted facets defined by the recess 120. The recess 120 thus forms an injection zone, for the injection of light rays into the planar waveguide 110. Within the planar waveguide 110, light is separated into as many main beams as there are tilted facets at the recess 120, here four. Each of these main beams propagates within the planar waveguide 110 from the recess 120 to the through opening 130 by successive reflections from the main faces 111, 112 of the planar waveguide, and by two reflections from two respective side faces of the planar waveguide. The light emerges from the through opening 130 in a plurality of orientations each obliquely tilted relative to the plane (x0y) of the planar waveguide 110. The through opening 130 thus forms an extraction zone, for extracting light rays from the planar waveguide 110.

In FIG. 1C, the optical paths followed by each of the four main beams in the planar waveguide have been schematically represented in dash and dot line. Each of the four main beams propagates through the planar waveguide 110 to a respective one of the tilted facets defined by the through opening 130. Each of the four main beams then emerges from the planar waveguide 110, by being refracted at one of the tilted facets defined by the through opening 130.

The main beams emerge from the planar waveguide on the opposite side to the light injection side into the planar waveguide, see especially FIG. 1A. In particular, light is injected here into the planar waveguide 110 on the first main face 111 side, and emerges from it on the second main face 112 side. In FIG. 1A, a surface 20 parallel to the plane (xOy), and facing the through opening 130 on the side where light emerges from the planar waveguide 110, has been illustrated. The surface 20 here defines the location of a scene to be lighted. In alternatives not represented, the scene to be lighted extends in the same plane as the main face 112, facing the through opening 130. The scene to be lighted 20 has, for example, a width of between 1 mm and 15 mm (largest distance between two points). It is a square with a side length of 1.36 mm. The dimensions of the scene to be lighted are substantially equal to the dimensions of the through opening 130 at the main face 111 (where the through opening 130 is narrower).

Figure 1F:
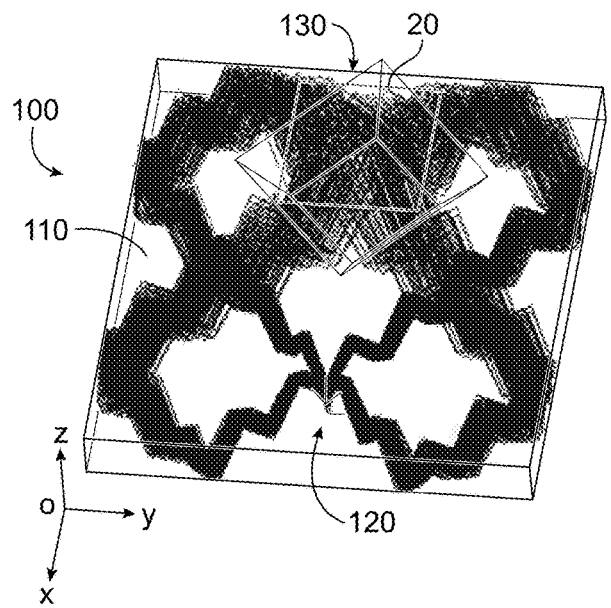
FIG. 1F illustrates the result of a ray tracing simulation in the device of FIG. 1A.
Figure 1G:
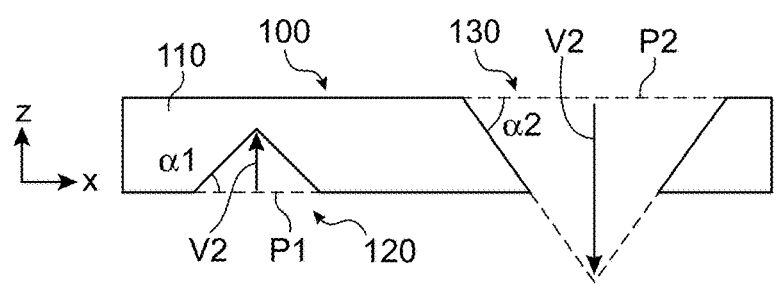

FIG. 1F illustrates the result of a ray tracing simulation in the device of FIG. 1A. There is again separation into four main beams, upon injection into the planar waveguide 110. As they propagate through the planar waveguide, each of these main beams spreads in planes parallel to the plane (xOy). In order to receive all or nearly all of each of said main beams, the volume occupied by the through opening 130 is much greater than the volume occupied by the recess 120, for example at least 10 times greater. The rays emerge from the planar waveguide 130 at the tilted facets defined by the through opening 130. By virtue of the light distribution into four main beams, and the spatial spread related to the propagation in a planar waveguide, light emerging from the planar waveguide 110 has a relatively homogeneous distribution at the scene to be lighted 20. In FIG. 1F, and for technical reasons related to the ray tracing simulation, the through opening 130 is represented with a depth along (Oz) greater than the thickness of the planar waveguide 110. This does not impact ray tracing.

Figure 2A:
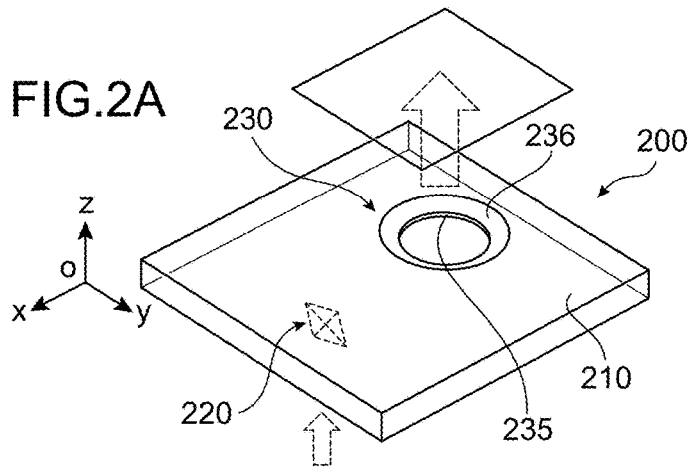
FIG. 2A schematically illustrates, and in a perspective view, a second embodiment of a light distribution device according to the invention.

FIG. 2A schematically illustrates, in a perspective view, a second embodiment of a light distribution device 200 according to the invention. The device 200 will be described only for its differences from the first embodiment described above.

In this second embodiment, the through opening 230 is delimited by a surface of revolution, which has axial symmetry about an axis parallel to the axis (Oz). A generatrix of this surface comprises a curved segment, and can further comprise a straight segment. Stated otherwise, the through opening 230 has the form of a volume of revolution, invariant about an axis parallel to the axis (Oz). This volume of revolution is defined by a generatrix. The intersection between this generatrix and the planar waveguide 210 corresponds to the generatrix of the surface of revolution stated above.

Figure 2B:
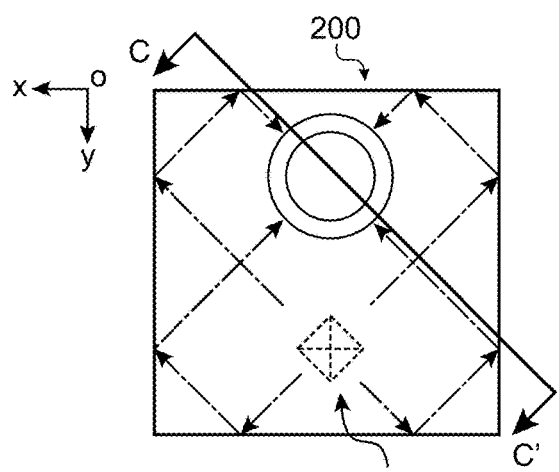
FIG. 2B, FIG. 2C illustrate different cross-section views of the device of FIG. 2A.

FIG. 2B illustrates the device 200 of FIG. 2A, in a top view. There are again the pyramidal recess 220, and the through opening 230 in this figure. The pyramidal recess 220 is similar to that of the device in FIGS. 1A to 1G, here with the triangular faces of the pyramid tilted by 54.74° relative to the plane (x0y).

Figure 2C:
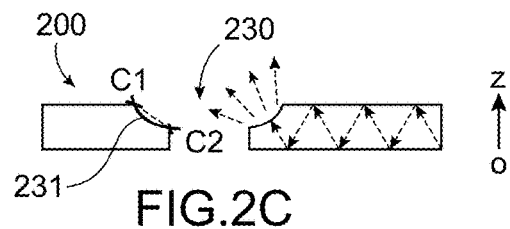

FIG. 2C illustrates the device 200 of FIG. 2A, in a cross-section view in a plane (CC') as indicated in FIG. 2B, passing through the through opening 230 and aligned with a direction of light propagation in the planar waveguide (plane parallel to (Oz) and tilted by 45° relative to (Ox) and (Oy)). FIG. 2C illustrates especially the generatrix 231 of the aforementioned surface of revolution. The generatrix 231 comprises a bent portion curved towards the interior of the planar waveguide 210. It further comprises a straight portion parallel to the axis (Oz). The bent portion is delimited by two points C1 and C2 connected by a segment tilted here by 45° relative to the plane of the planar waveguide. The generatrix 231 defines a surface of revolution, which includes a curved surface 236 associated with the bent portion of the generatrix. Here, the surface of revolution further comprises a surface 235 in the form of a cylinder of revolution, associated with the straight portion of the generatrix 231 (see FIG. 2A). The curved surface 236 acts as a concave lens in planes orthogonal to the axis (Oz), and thus diverges light emerging from the planar waveguide (see FIG. 2C). The homogeneity of light distribution at the output of the planar waveguide 210 is thus further improved.

Figure 2D:
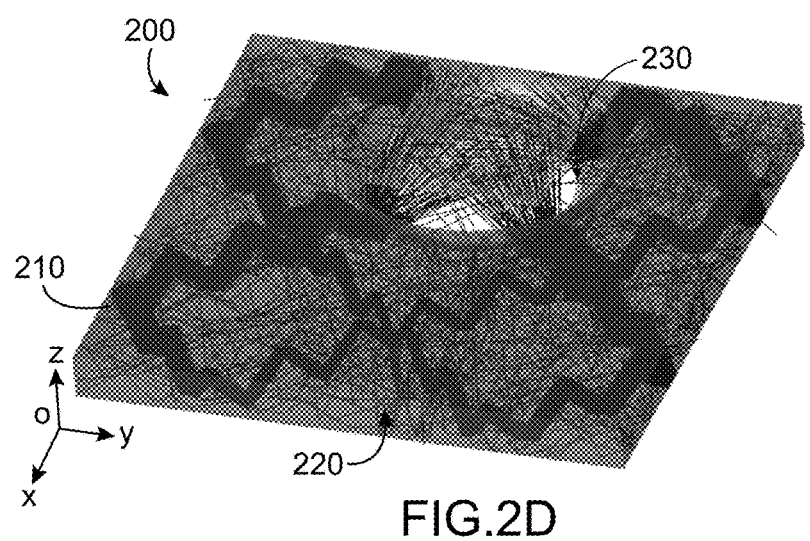
FIG. 2D illustrates the result of a ray tracing simulation in the device of FIG. 2A.

FIG. 2D illustrates the result of a ray tracing simulation in the device of FIG. 2A. There is again the separation into four main beams, upon injection into the planar waveguide 210, and the spatial spreading of the main beams as they propagate through the planar waveguide, from the recess 220 to the through opening 230. The light rays emerge from the planar waveguide at the curved surface 236 of the through opening 230, by being scattered by the curved surface 236 acting as a diverging lens.

Figure 3A:
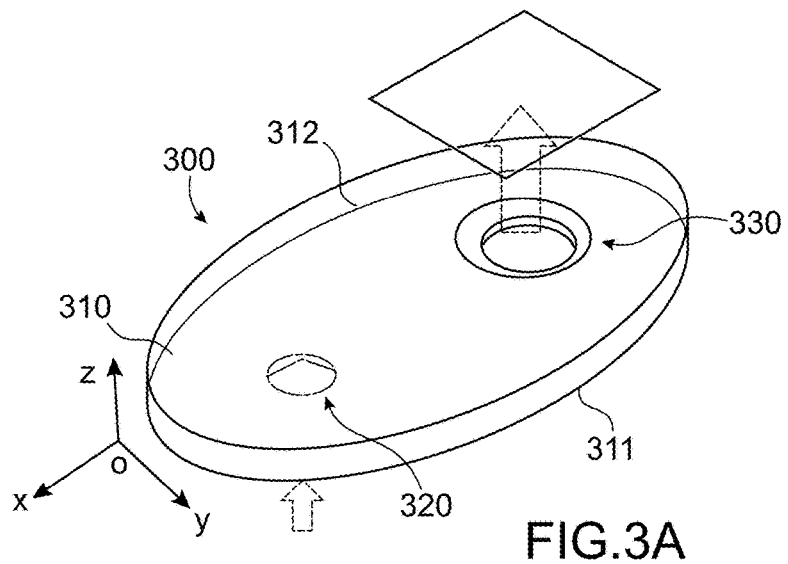
FIG. 3A schematically illustrates, and in a perspective view, a third embodiment of a light distribution device according to the invention.

FIG. 3A schematically illustrates, in a perspective view, a third embodiment of a light distribution device 300 according to the invention. The device 300 will be described only for its differences from the second embodiment described above.

In this embodiment, the planar waveguide 310 is shaped like a right cylinder. The bases of the cylinder form the main faces 311, 312 of the planar waveguide, and each has an ellipse shape. Each of the ellipses is provided with two foci.

Figure 3B:
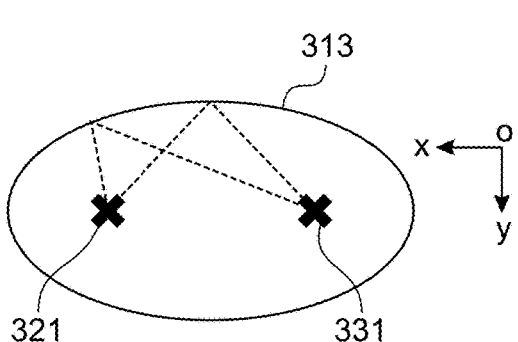
FIG. 3B schematically illustrates the respective positions of the recess and the through opening in a device similar to that of FIG. 3A.

FIG. 3B schematically illustrates the positioning of the recess 320 and the through opening 330 in the planar waveguide 310. In FIG. 3B, the device 300 has been represented in a projection in the plane of one of the main faces 311, 312. A first cross 321 symbolises the projection, in this plane, of the geometric centre of the recess 320. A second cross 331 symbolises the projection, in this plane, of the geometric centre of the through opening 330. The projection of the planar waveguide 310 in this plane has the shape of an ellipse 313. The two crosses 321, 331 are each located on a respective focus of the ellipse 313. An ellipse can be defined as all the points whose sum of distances to two fixed points, called foci, is constant. This positioning of the recess and the through opening therefore ensures the same cumulative optical path length for all the light rays travelling in the planar waveguide between the recess and the through opening. FIG. 3B illustrates in dashed lines the optical path travelled by light in the planar waveguide 310, for two initial orientations of the light upon injection.

In this embodiment, the recess 320 is shaped like a whole or slightly truncated-square cone of revolution. The tip of the cone is on the side of the main face 312 of the planar waveguide 310, while the base of the cone is on the side of the other main face 311 of the planar waveguide 310.

The through opening 330 is similar to the through opening described with reference to FIGS. 2A and 2B.

Figure 3C:
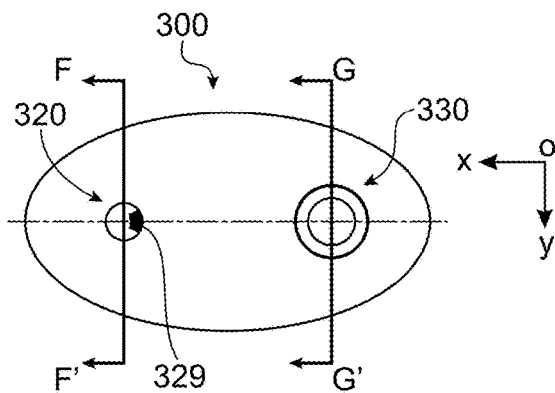
FIG. 3C, FIG. 3D, FIG. 3E illustrate different cross-section views of the device of FIG. 3A.

FIG. 3C illustrates the device 300 of FIG. 3A, in a top view. There are also the conical recess 320 and through opening 330 in this figure.

Figure 3D:
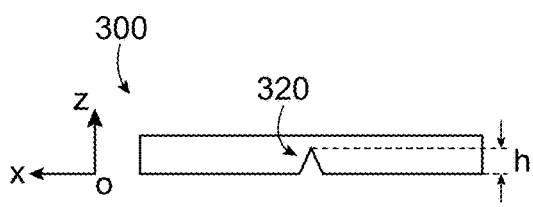

FIG. 3D illustrates the device 300 of FIG. 3A, in a cross-section view in a plane (FF') as indicated in FIG. 3C, parallel to the plane (yOz) and passing through the conical recess 320. As in the exemplary embodiments described above, the height h of the recess 320 is strictly lower than the thickness of the planar waveguide, for example at least twice lower.

Figure 3E:
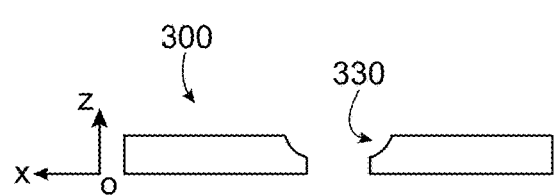

FIG. 3E illustrates the device 300 of FIG. 3A, in a cross-section view in a plane (GG') as indicated in FIG. 3C, parallel to the plane (yOz) and passing through the through opening 330. FIG. 3E is here identical to FIG. 2C, the shape of the through opening being identical in the second and third embodiments of the invention.

In operation, and as in the first and second embodiments, an injection light beam arrives at the device 300, on the side of the first main face 311. Preferably, the injection light beam is oriented along an axis normal to the plane of the planar waveguide, advantageously aligned with a central axis of the recess 320 (here an axis connecting the tip and the centre of the cone base). Light from said beam is injected into the planar waveguide, and then emerges from the planar waveguide on the side of the second main face 312. As in the first and second embodiments, light propagates in the planar waveguide 310 from the recess 320 to the through opening 330. In this embodiment, light is evenly distributed 360° around the centre of the recess 320, upon injection into the planar waveguide 310. On extraction, the circular symmetry of the through opening allows this homogeneous distribution to be maintained, this time over 360° around the centre of the circular opening 330. This embodiment therefore offers optimal radial homogeneity in light distribution at the output of the device according to the invention.

As in the first and second embodiments, the volume occupied by the through opening 330 is much greater than the volume occupied by the recess 320, for example at least 10 times greater.

In operation, each light beam travels through the planar waveguide from the recess 320 to the through opening 330 by multiple reflections from the main faces of the planar waveguide, and by a single reflection from the side face of the planar waveguide. Advantageously, the device 300 includes an element 329 to prevent light rays from travelling directly from the recess 320 to the through opening 330, without reflection from the side face of the planar waveguide (see FIG. 3C). The element 329 is capable of blocking (absorption) or deflecting (by reflection or refraction) light rays that would otherwise propagate in a straight line from the recess 320 to the through opening 330. The element 329 can consist of a non-transmissive (absorbing or reflective) coating, covering part of the side surface of the recess 320 on the side of the through opening. Alternatively, the element 329 can consist of a spatial filter, preferably in the form of an angular sector, which extends in a plane parallel to the plane of the planar waveguide facing the recess 320 and prevents part of an injection light beam from reaching the recess 320. According to another alternative, the element 329 can consist of a solid zone, located within the recess 320 on the side of the through opening. The solid zone may be opaque, or reflective, or even transparent to the operating wavelengths of the device 300 (deflection of the rays by refraction). An assembly formed by the recess 320 and the element 329 inside the latter has the shape of a portion of a cone of revolution, defined by a rotation angle of at least 240°.

According to an alternative not represented to the embodiment of FIGS. 3A to 3E, the through opening has the shape of a truncated-square cone of revolution. An axis of symmetry of the cone of revolution extends along (Oz), passing through one of the foci of the ellipse, at each of the main faces of the planar waveguide. The cones of revolution respectively defining the shape of the recess and the shape of the through opening are oriented in opposite directions.

In each of the embodiments, the light distribution device according to the invention provides a solution for distributing light over a scene to be lighted, with oblique lighting. In particular, the scene to be lighted is parallel to the planar waveguide, and light emerges from the through opening by being obliquely tilted to the planar waveguide.

The device according to the invention has low losses, as well as a good flow resistance (especially in comparison with a light distribution device based on optical fibres). It has also a large compactness, and in particular a reduced thickness allowing it to be used as a spacer between the sample and the detection module in the lensless optical imaging system described in the introduction.

In each of the embodiments, the light distribution device according to the invention receives light from a first half-space, and projects light towards a second half-space. Both half-spaces are separated by a plane parallel to the main faces of the planar waveguide and passing halfway up through the planar waveguide.

A light distribution device similar to the invention is described below, configured for, in use, distributing light rays from an ancillary light source onto a scene to be lighted, and which comprises:

a planar waveguide, of which two faces of greater extent are parallel to each other and each form a respective main face of the planar waveguide; and an input facet, obliquely tilted relative to the planes of the main faces of the planar waveguide, at a first tilt angle (31, and forming an injection zone for the injection of light rays into the light distribution device; and an extraction surface, located in the planar waveguide, and forming an extraction zone for extracting light rays from the planar waveguide, with the extraction surface and the input facet being non-parallel to each other.

The input facet can extend directly into the planar waveguide. Alternatively, the input facet may be formed in an injection substrate distinct from the planar waveguide. The injection substrate is then abutted against, and in optical contact with, the planar waveguide so that light rays are not reflected or scattered at an interface between the injection substrate and the planar waveguide. During manufacture, two substrates can be abutted together by direct bonding (a method using Van der Waals forces). One of the substrates can be thinned prior to etching, and form the injection substrate, while the other substrate forms the planar waveguide. Where appropriate, each of the substrates is adapted to a distinct value of an anisotropic etching angle.

Figure 4A:
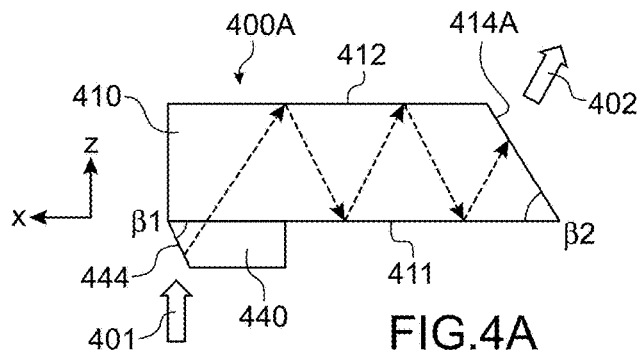
FIG. 4A schematically illustrates, and in a side view, a first embodiment of a light distribution device similar to the invention.

An example of such a device 400A is illustrated in FIG. 4A. The device 400A of FIG. 4A includes a planar waveguide 410, with two main faces 411, 412 parallel to the plane (xOy), and a substrate 440 referred to as the injection substrate.

The planar waveguide 410 includes an extraction surface 414A, formed here by a transverse planar face of the planar waveguide. The extraction surface 414A obliquely extends between the two main faces 411, 412 of the planar waveguide, which is neither parallel nor orthogonal to these two faces. The extraction surface 414A is tilted here by an angle β2, relative to the main faces 411, 412. For example, β2=45°.

The injection substrate 440 is abutted against one of the main faces of the planar waveguide, on the side of the waveguide 410 opposite to the side of the extraction surface 414A. It has an input facet 444, obliquely tilted relative to the main faces of the planar waveguide, at a tilt angle β1. Here β1=54.74°. In any case, β1 is different from β2. Advantageously, the angles β1 and β2 correspond to anisotropic etching angles in a crystal of the same nature.

Here, the injection substrate 440 also includes two large faces, parallel to the main faces of the planar waveguide. Advantageously, it has a thickness much lower than that of the planar waveguide 410, for example at least twice lower. The injection substrate 440 advantageously consists of a crystal of the same nature as the planar waveguide 410.

In operation, light enters the interior of the device 400A through the input facet 444, being refracted. The light passes through the injection substrate 440, and enters the planar waveguide 410 at its first main face 411. It then propagates in the planar waveguide 410 by successive reflections from its main faces 411, 412, and then emerges from the planar waveguide 410 through the extraction surface 414, being refracted. The input facet 444 thus forms an injection zone, and the extraction surface 414 an extraction zone. In FIG. 4A, the light path within the device 400A has been represented as a dashed line. Two thick arrows 401, 402 symbolise the light beam injected into, respectively extracted from the device 400A. The light propagation in the planar waveguide 410 achieves a spatial light spreading, for a better spatial light distribution leaving the device 400A.

This embodiment allows for oblique lighting from a light beam arriving at the device 400A oriented along an axis normal to the main faces 411, 412 of the planar waveguide, respectively along an axis parallel to said faces (for example for β1=54.74° and β2=45°, respectively for β1=45° and β2=54.74°).

Alternatively, the extraction surface 414 can form an injection zone and the input facet 444 an extraction zone, to achieve normal lighting from an oblique injection.

In the example of FIG. 4A, the extraction surface is a planar surface, and the input facet belongs to an injection substrate distinct from the planar waveguide.

Alternatively, the extraction surface is a curved surface.

Additionally or alternatively, the input facet belongs to the planar waveguide.

Advantageously, the extraction surface is a curved surface, and the input facet belongs to the planar waveguide. Indeed, when the extraction surface is curved, it is not made by anisotropic etching so that making the input facet on a distinct substrate is of less interest.

Figure 4B:
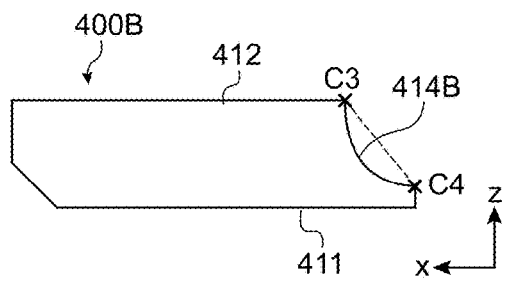
FIG. 4B, and FIG. 4C, illustrate schematically a first alternative embodiment of the embodiment of FIG. 4A.
Figure 4C:
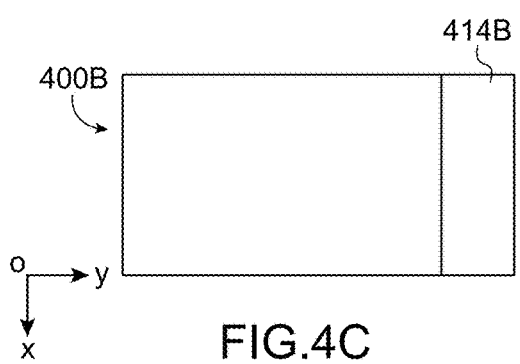

The extraction surface may be a surface curved in planes (xOz) and straight along the axis (Oy), where the axis (Oy) is parallel to the main faces 411, 412 of the planar waveguide. An example of such an embodiment is illustrated by the device 400B in FIGS. 4B and 4C. In this embodiment, the extraction surface 414B acts as a diverging lens, to diverge light emerging from the planar waveguide in planes orthogonal to the axis (Oy). The extraction surface 414B is delimited by two points C3 and C4, connected by a segment tilted here by 45° relative to the plane of the planar waveguide.

Figure 4D:
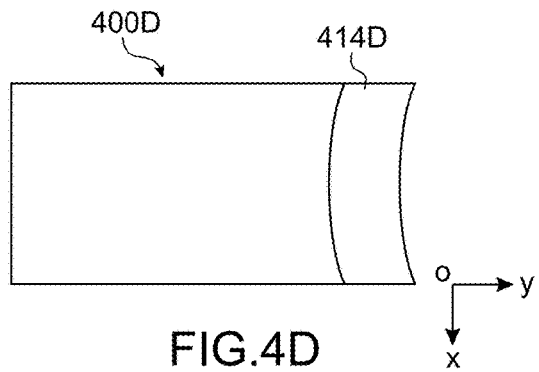
FIG. 4D schematically illustrates a second alternative embodiment of the embodiment of FIG. 4A.

According to another alternative, the extraction surface is curved along the three dimensions of space, to make the light emerging from the planar waveguide diverge in all dimensions of the three-dimensional space. An example of such an embodiment is illustrated by the device 400D of FIG. 4D and the extraction surface 414D. In a cross-section view in a plane (xOz), the extraction surface 414D is identical to the extraction surface 414B of FIG. 4B. In a top view in a plane (xOy), the extraction surface 414D is curved, and no longer straight.

Figure 5:
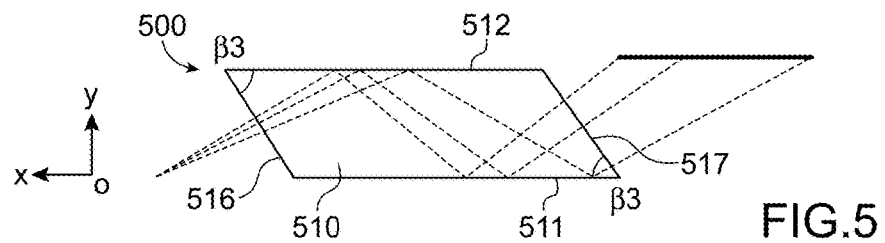
FIG. 5 schematically illustrates, and in side view, a second embodiment of a light distribution device similar to the invention.

An adjacent light distribution device of the invention is also described, which is configured to, in use, distribute light rays from an ancillary light source onto a scene to be lighted, and which includes a planar waveguide, two larger faces of which are parallel to each other and each form a respective main face of the planar waveguide, wherein the planar waveguide also comprises two transverse faces parallel to each other, obliquely oriented relative to the main faces, and forming respectively an injection zone for injecting light rays into the light distribution device, and an extraction zone for extracting light rays from the planar waveguide. An example of such a device 500 is illustrated in FIG. 5. The planar waveguide 510 comprises two main faces 511, 512 parallel to the plane (xOy), and two transverse faces 516, 517 parallel to each other and obliquely tilted relative to the main faces 511, 512. The transverse faces 516, 517 are tilted here by an angle β3 relative to the main faces 516, 517. For example β3=54.74°. In operation, light enters the planar waveguide 510 at the transverse face 516, and then propagates through the planar waveguide 510 by successive reflections from its main faces 511, 512, and finally emerges from the planar waveguide through the opposite transverse face 517. The transverse face 516 thus forms an injection zone, while the opposite transverse face 517 forms an extraction zone. Propagation in the planar waveguide 510 achieves a spatial light spreading in the plane (xOy) of the planar waveguide.

Figure 6:
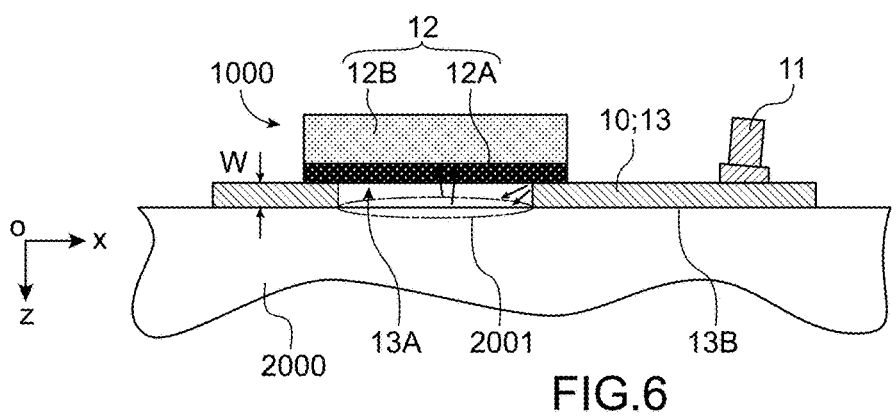
FIG. 6 schematically illustrates an infrared imaging system according to the invention.

FIG. 6 illustrates an infrared imaging system 1000, which includes a light distribution device 10 according to the invention, as well as an infrared light source 11, a detector module 12 (or imaging module), and a spacing element 13.

The infrared light source 11 is configured to emit at least one light beam at an infrared wavelength. The infrared light source 11 can comprise one or more elemental sources, among:

at least one laser source, such as a quantum cascade laser (QCL), an interband cascade laser (ICL), an outer or inner cavity laser;
at least one LED;
at least one blackbody source, etc.

A diaphragm, not represented, can be arranged at the output of the infrared light source 11 to cut off rays that are too tilted relative to the emission axis.

The detection module 12 comprises an array infrared detector 12A sensitive to infrared and more particularly to operating wavelengths of the light distribution device 300 10. The array infrared detector 12A comprises, for example, an array of semiconductor photodiodes or an array of bolometers. It extends along a square or rectangular surface, preferably with sides between 1 mm and 10 mm. Here it extends in a plane (xOy). The detector module 12 further comprises a readout circuit 12B, for reading out electrical signals provided by the array infrared detector 12A.

The spacing element 13, or spacer is integrally mounted with the detection module 12 on the side of the array infrared detector 12A. It includes a through opening 13A, facing the array infrared detector 12A, and a support surface 13B, on the side opposite to the detection module 12 and for contacting a sample to be analysed. The support surface 13B here extends in a plane parallel to the plane (xOy), parallel to the plane of the array infrared detector 12A. The spacing element 13 has a thickness W, measured along axis (Oz). In operation, the support surface 13B is pressed against a sample 2000. A region of the sample 2000 facing the through opening 13A forms a scene to be lighted 2001. The spacing element 13 ensures a predetermined fixed distance between the scene to be lighted 2001 and the array infrared detector 12A, called a working distance. The working distance is preferably between 100 µm and 1.5 mm. The spacing element also sets the extent of the scene to be lighted 2001, delimited by the edges of the through opening 13A. The diameter of the through opening 13A is advantageously of the same order of magnitude as that of the array infrared detector 12A.

The light distribution device 10 is configured to receive light from the infrared light source 11 as input, and to distribute this light over the scene to be lighted 2001.

The light distribution device 10 is here the same as the spacing element 13. The device 10 includes in particular:
- a planar waveguide, with a thickness W;
- a through opening forming an extraction zone, here the same as the through opening 13A in the spacing element 13; and
- a recess, not represented, forming an injection zone, and at which the infrared light source 11 is situated.

The infrared light source 11 is here situated on the spacing element 13, which also forms the light distribution device 10, on the side opposite to the support surface 13B.

In alternatives not represented, the light distribution device 10 only forms a part of the spacing element 13. For example, the spacing element 13 may be formed by superimposing the light distribution device 10 and an additional shim, wherein the additional shim is provided with a through opening aligned with the through opening of the light distribution device 10. In any case, the small thickness of the light distribution device according to the invention, advantageously between 100 µm and 1.5 mm, enables it to form all or part of the spacing element 13.

The detection module 12 and the spacing element 13 can be considered to form together a lensless imaging system, capable of acquiring an image of the scene to be lighted, without image forming refractive optics (apart from possibly a microlens array upstream of the array infrared detector 12A). The images obtained are wide-field images, in reflection.

The infrared imaging system 1000 is advantageously formed in a photonic chip.

It is noticed that the system as illustrated in FIG. 6 can be combined with any of the embodiments similar to the invention described above.

In the different embodiments of the invention, and the different similar embodiments of the invention, the planar waveguide is preferably of crystalline silicon. The interfaces in the planar waveguide, forming the injection zone and the extraction zone, can each be made using at least one of the following methods:

1/ Standard manufacturing method, wherein the injection zone and/or the extraction zone is/are made by directly etching an initial silicon substrate.

2/ Alternative standard manufacturing method, in which the injection zone and/or the extraction zone is/are made by directly etching an initial substrate, wherein the initial substrate consists of an infrared-transparent crystalline material distinct from silicon, for example crystalline germanium, crystalline zinc sulphide, crystalline barium chloride, crystalline barium fluoride etc.

3/ Moulding and stamping manufacturing method, in which a crystalline silicon light distribution device pattern is manufactured by a standard manufacturing method as mentioned in 1/. The pattern is then replicated in an ancillary material which needs not be crystalline. The ancillary material advantageously has better infrared transparency properties than crystalline silicon. This can be chalcogenide glasses. The replication can implement a moulding and stamping method.

4/ Alternative manufacturing method by moulding and stamping, in which a crystalline silicon mould is directly manufactured by a standard manufacturing method as mentioned in 1/. The light distribution device is made by stamping using this mould, and consists of an ancillary material such as the one mentioned in 3/ above.

The standard manufacturing method mentioned in 1/ can implement anisotropic etching on crystal planes. The anisotropic etching comprises masking the zones to be preserved and bathing in a solution containing an anisotropic etchant. The etchant includes, for example, potash (KOH), or ethylene diamine pyrocatechol (EDP). The etchant has preferential etching directions, relative to the crystal lattice (face-centred cubic lattice, in the case of silicon). Anisotropic etching on crystal planes makes it possible to etch, in a substrate with two large faces parallel to each other, at least one planar surface obliquely tilted $\gamma$ relative to the large faces. The value of $\gamma$ depends on the substrate's crystal lattice and the etching direction favoured. In particular, for a crystalline silicon substrate, $\gamma=45°$ or $\gamma=54.74°$.

Alternatively, the standard manufacturing method mentioned in 1/ can implement isotropic etching, allowing concave curved surfaces to be etched into a substrate.

The invention is therefore concerned with a device forming a passive extraction structure, advantageously coupled to one or more quantum cascade lasers, and for use at very short working distances. The device according to the invention preferably has a smaller entrance pupil than the exit pupil. It is advantageously adapted to light injection along an axis normal to the plane of the planar waveguide. Preferably, all the light rays emerging from the device according to the invention have travelled a path of the same cumulative length in the planar waveguide.

The invention makes it possible to distribute light of an infrared light beam, preferably belonging to the spectral range from 2 µm to 12 µm. It finds application especially in the field of active multispectral imaging and active hyperspectral imaging, to obtain biochemical information easily and quickly. In particular, the chemical composition of a sample can be determined from its infrared light absorption signature.

The invention is not limited to the examples detailed above, and many other examples can be implemented without departing from the scope of the invention. For example, the recess and/or through opening may be filled with a solid infrared-transparent material providing a sufficient optical index difference with the material of the planar waveguide.

In the invention (as well as in embodiments similar to the invention), the planar waveguide is preferably made of silicon. However, the invention is not limited to this material, as the planar waveguide can be made of any other material having at least one infrared transparency window, for example germanium, zinc sulphide, barium chloride, barium fluoride, etc. For use at wavelengths longer than 10 μm, the planar waveguide advantageously consists of crystalline germanium, which then has a lower absorption than silicon. When the crystalline material has a different lattice from silicon, anisotropic etching yields other etch angle values.

A greyscale diaphragm can be arranged upstream of the light distribution device according to the invention, to homogenise lighting on the scene to be lighted.

The invention claimed is:

1. A light distribution device configured to, in use, distribute light rays from an ancillary light source onto a scene to be lighted, wherein:
   a planar waveguide, of which two faces of greater extent are parallel to each other and each form a respective main face of the planar waveguide;
   a recess, which extends into the planar waveguide from one of the main faces, and which forms an injection zone configured to perform injection of light rays into the planar waveguide; and
   a through opening, which extends into the planar waveguide from one of its main faces to the other, and which forms an extraction zone configured to perform extraction out of the planar waveguide of light rays injected into the injection zone and having travelled in the planar waveguide,
   wherein the recess is configured to split injected light from said injection zone into beams so that each beam propagates within the planar waveguide from the recess to the through opening by successive reflections from faces of the planar waveguide.

2. The device according to claim 1, wherein the planar waveguide is infrared transparent.

3. The device according to claim 1, wherein:
   the recess is configured to perform injection, into the planar waveguide, of light rays from an upper half-space; and
   the through opening is configured to perform extraction of light rays, out of the planar waveguide, and into a lower half-space;
   wherein the lower and upper half-spaces together form a three-dimensional space, and each extend to a respective side of a plane parallel to the main faces of the planar waveguide and passing halfway up through the planar waveguide.

4. An infrared imaging system comprising:
   a light distribution device according to claim 1, configured to, in use, distribute light rays from an ancillary light source onto a scene to be lighted; and
   a detection module, including an array infrared detector configured to receive light rays returned by the scene to be lighted;
   with the infrared array detector facing the through opening of the light distribution device.

5. The system according to claim 4, further comprises an infrared light source forming the ancillary light source, and wherein the light distribution device is configured to, in use, receive as input light rays from said infrared light source and distribute these rays over the scene to be lighted, with the input of the light distribution device formed by the recess of the light distribution device.

6. The system according to claim 4, comprising a spacing element, integrally mounted with the detection module, and including a support surface and a through opening, with the support surface located on a side of the spacing element opposite to the detector module, and with the through opening facing the array infrared detector, and wherein the light distribution device forms all or part of the spacing element.

7. A light distribution device configured to, in use, distribute light rays from an ancillary light source onto a scene to be lighted, wherein:
   a planar waveguide, of which two faces of greater extent are parallel to each other and each form a respective main face of the planar waveguide;
   a recess, which extends into the planar waveguide from one of the main faces, and which forms an injection zone configured to perform injection of light rays into the planar waveguide; and
   a through opening, which extends into the planar waveguide from one of its main faces to the other, and which forms an extraction zone configured to perform extraction out of the planar waveguide of light rays injected into the injection zone and having travelled in the planar waveguide, wherein:
   the planar waveguide has its two main faces each in square shape and has a rectangular parallelepiped shape, and
   in a projection of the light distribution device in the plane of one of the main faces of the planar waveguide, the recess and the through opening are each centred on a line separating said main face into two rectangles of the same dimensions, with the respective centres of the recess and the through opening each being located at the same distance from the centre of said main face.

8. The device according to claim 7, wherein the recess has a shape of a first pyramid, wherein said first pyramid is a square-based right pyramid.

9. The device according to claim 8, wherein the through opening has a shape of a second, truncated-square pyramid, wherein said second pyramid is a square-based right pyramid.

10. The device according to claim 9, wherein the first pyramid and the second pyramid have their respective bases parallel to the main faces of the planar waveguide, and are oriented in two opposite directions.

11. The device according to claim 8, wherein the through opening has the shape of a volume of revolution, invariant about an axis orthogonal to the main faces of the planar waveguide, and wherein the intersection between the planar waveguide and a generatrix of said volume of revolution comprises a bent segment.

12. A light distribution device configured to, in use, distribute light rays from an ancillary light source onto a scene to be lighted, wherein:
   a planar waveguide, of which two faces of greater extent are parallel to each other and each form a respective main face of the planar waveguide;
   a recess, which extends into the planar waveguide from one of the main faces, and which forms an injection zone configured to perform injection of light rays into the planar waveguide; and
   a through opening, which extends into the planar waveguide from one of its main faces to the other, and which forms an extraction zone configured to perform extraction out of the planar waveguide of light rays injected into the injection zone and having travelled in the planar waveguide, wherein:

the planar waveguide has its two main faces each in the shape of an ellipse and has a shape of a right cylinder with an elliptical base, each ellipse-shaped main face is provided with two foci, and in a projection of the light distribution device in the plane of one of the main faces of the planar waveguide, the recess and the through opening are each centred on a respective one of said foci.

13. The device according to claim 12, wherein the recess is shaped as a whole or truncated-square cone of revolution.

14. The device according to claim 12, wherein the through opening has the shape of a volume of revolution, invariant about an axis orthogonal to the main faces of the planar waveguide, and wherein the intersection between the planar waveguide and a generatrix of said volume of revolution comprises a bent segment.

* * * * *